(12) United States Patent
Uneura et al.

(10) Patent No.: US 10,215,089 B2
(45) Date of Patent: Feb. 26, 2019

(54) VARIABLE-FLOW-RATE VALVE MECHANISM AND TURBOCHARGER

(71) Applicant: IHI Corporation, Koto-ku (JP)

(72) Inventors: Yutaka Uneura, Tokyo (JP); Jaemin Huh, Tokyo (JP)

(73) Assignee: IHI Corporation, Koto-ku (JP)

( * ) Notice: Subject to any disclaimer, the term of this patent is extended or adjusted under 35 U.S.C. 154(b) by 21 days.

(21) Appl. No.: 15/407,648

(22) Filed: Jan. 17, 2017

(65) Prior Publication Data

US 2017/0122192 A1    May 4, 2017

Related U.S. Application Data

(63) Continuation of application No. PCT/JP2015/070926, filed on Jul. 23, 2015.

(30) Foreign Application Priority Data

Aug. 29, 2014  (JP) ................................. 2014-176202

(51) Int. Cl.
*F02B 37/18* (2006.01)
*F01D 17/10* (2006.01)

(52) U.S. Cl.
CPC .......... *F02B 37/186* (2013.01); *F01D 17/105* (2013.01); *F02B 37/183* (2013.01);
(Continued)

(58) Field of Classification Search
CPC .... F02B 37/186; F02B 37/183; Y02T 10/144; F01D 17/105; F05D 2220/40
See application file for complete search history.

(56) References Cited

U.S. PATENT DOCUMENTS 4,539,953 A * 9/1985 Sasaki ..................... F01L 1/185
123/90.22
2009/0028694 A1   1/2009 Naemura et al.
(Continued)

FOREIGN PATENT DOCUMENTS

CN        102414418 A       4/2012
CN        103998743 A       8/2014
(Continued)

OTHER PUBLICATIONS

WO 2013/189575 English language machine translation.*
(Continued)

*Primary Examiner* — Mark A Laurenzi
*Assistant Examiner* — Wesley G Harris
(74) *Attorney, Agent, or Firm* — Oblon, McClelland, Maier & Neustadt, L.L.P.

(57) ABSTRACT

In a variable-flow-rate valve mechanism, a valve is fitted into an attachment hole of an attachment member. The valve allows for play with the attachment member, and includes a valve body provided with a valve surface. A valve shaft is integrally formed in the center of a head portion of the valve body. A stopping member is provided to a leading end portion of the valve shaft. A leaf spring is provided to the valve shaft. The leaf spring includes a folded-back portion formed by bending. An insertion hole is formed in one end portion of the leaf spring. A cutout portion is formed in another end portion of the leaf spring. The one end portion of the leaf spring is fixed to the attachment member and the other end portion of the leaf spring is pressed to the head portion of the valve body.

6 Claims, 10 Drawing Sheets

(52) U.S. Cl.
CPC ...... *F05D 2220/40* (2013.01); *F05D 2260/38* (2013.01); *F05D 2260/606* (2013.01); *F05D 2260/96* (2013.01); *Y02T 10/144* (2013.01)

(56) References Cited

U.S. PATENT DOCUMENTS

| | | | |
|---|---|---|---|
| 2011/0126537 A1 | 6/2011 | Yoshimoto et al. | |
| 2012/0055154 A1* | 3/2012 | Ebert | F01D 17/105 60/602 |
| 2013/0333379 A1 | 12/2013 | Hinkelmann et al. | |
| 2014/0321986 A1 | 10/2014 | Takahashi et al. | |
| 2014/0366530 A1 | 12/2014 | Murayama et al. | |
| 2015/0118027 A1 | 4/2015 | Zieboli et al. | |

FOREIGN PATENT DOCUMENTS

| | | | |
|---|---|---|---|
| JP | 57-80625 | 5/1982 | |
| JP | 58-4732 | 1/1983 | |
| JP | 59-62233 | 4/1984 | |
| JP | 61-33923 U | 3/1986 | |
| JP | 10-103069 | 4/1998 | |
| JP | 2001-263078 | 9/2001 | |
| JP | 2008-25442 | 2/2008 | |
| JP | 2008-101589 | 5/2008 | |
| JP | 2009-236088 | 10/2009 | |
| JP | 2010-209688 | 9/2010 | |
| JP | 2011-106358 | 6/2011 | |
| JP | 2012-527575 | 11/2012 | |
| JP | 2013-155687 | 8/2013 | |
| JP | 2013-185552 | 9/2013 | |
| WO | WO 2013087182 A2 * | 6/2013 | ............ F02B 37/186 |
| WO | WO 2013/133371 A1 | 9/2013 | |
| WO | WO 2013/189575 A1 | 12/2013 | |
| WO | WO 2013189575 A1 * | 12/2013 | ............ F02B 37/186 |

OTHER PUBLICATIONS

WO 2013/087182 English language machine translation.*
International Search Report dated Oct. 27, 2015 in PCT/JP2015/070926, filed on Jul. 23, 2015 (with English Translation).
Written Opinion dated Oct. 27, 2015 in PCT/JP2015/070926, filed on Jul. 23, 2015.
Combined Office Action and Search Report dated Jun. 22, 2018 in Chinese Patent Application No. 201580039119.2 (with English translation of categories of cited documents) citing references AO-AP therein, 11 pages.
Office Action dated Dec. 11, 2018, in corresponding Japanese Patent Application No. 2014-176202, references AA and AO-AR cited therein.

* cited by examiner

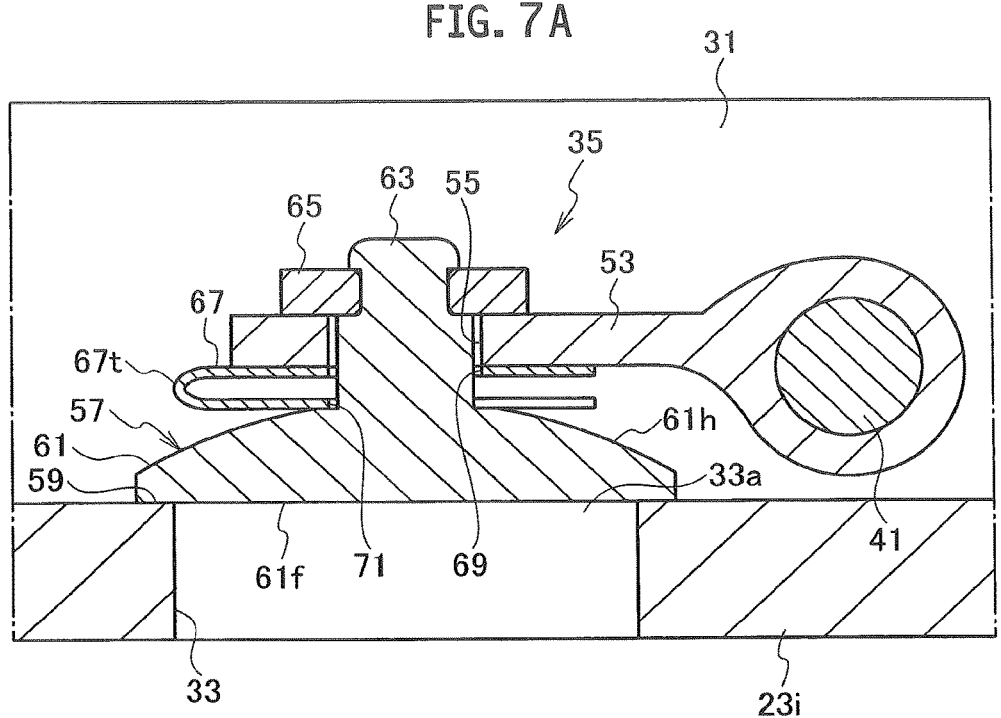
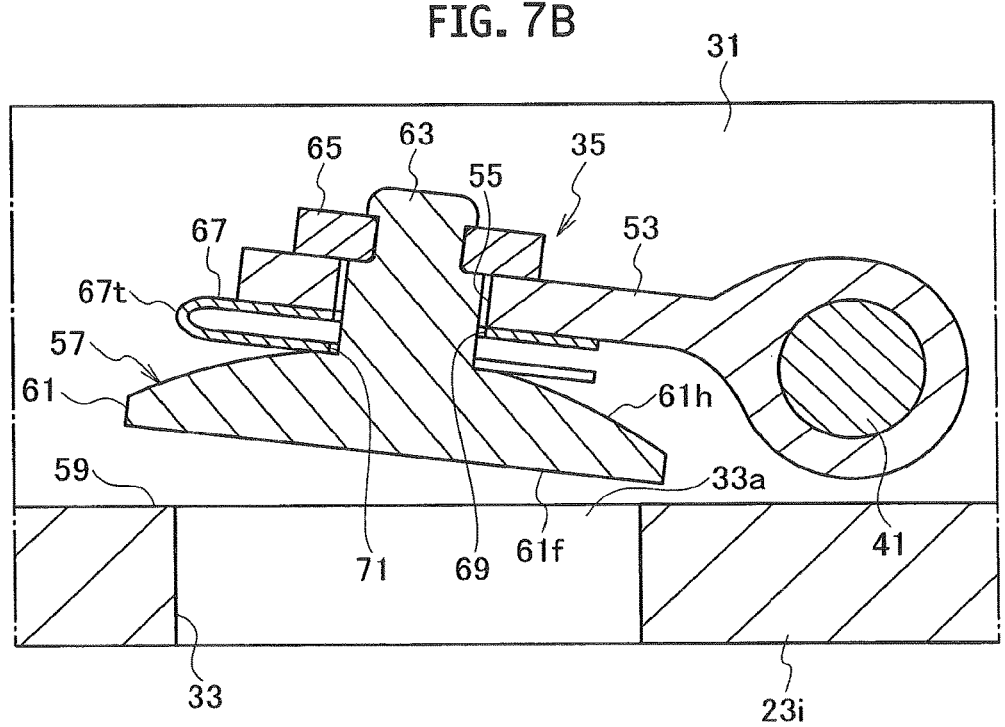

VARIABLE-FLOW-RATE VALVE MECHANISM AND TURBOCHARGER

CROSS REFERENCE TO RELATED APPLICATIONS

This application is a continuation application of International Application No. PCT/JP2015/070926, filed on Jul. 23, 2015 which claims priority to Japanese Patent Application No. 2014-176202, filed on Aug. 29, 2014 the entire contents of which are incorporated by reference herein.

BACKGROUND

1. Technical Field

The present disclosure relates to a variable-flow-rate valve mechanism and the like, which opens and closes an aperture of a variable-flow-rate gas passage in order to adjust a flow rate of an exhaust gas to be supplied to a turbine wheel side in a turbocharger such as a vehicle turbocharger.

2. Description of the Related Art

In a turbine housing of a vehicle turbocharger, a bypass passage for causing part of an exhaust gas to bypass a turbine wheel is usually formed as a countermeasure for suppressing an excessive rise in boost pressure by the vehicle turbocharger. Moreover, a waste gate valve configured to open and close an aperture (an aperture on an outlet side) of the bypass passage is provided at an appropriate position of the turbine housing. Here, the bypass passage is one of variable-flow-rate gas passages configured to adjust a flow rate of the exhaust gas to be supplied to the turbine wheel side, while the waste gate valve is one of variable-flow-rate valve mechanisms configured to open and close the aperture of the variable-flow-rate gas passage. Here, a general configuration and the like of the waste gate valve being one of the variable-flow-rate valve mechanisms are as follows.

A support hole is penetratingly formed in an outer wall portion of the turbine housing. A stem (a rotating shaft) is supported in this support hole in such a way as to be rotatable in forward and reverse directions. A base end portion (one end portion) of the stem projects outward from the outer wall portion of the turbine housing. A base end portion (one end portion) of a link member is integrally connected to the base end portion of the stem. The link member is driven by an actuator to swing in the forward and reverse directions around a shaft center of the stein.

A base end portion of an attachment member is integrally connected to a leading end portion (another end portion) of the stem. An attachment hole is penetratingly formed in a leading end portion of the attachment member. Moreover, a valve is fitted into the attachment hole of the attachment member. The valve allows for play (inclusive of tilt and slight movement) with the attachment member. The valve includes: a valve body (a valve body portion) provided with a valve surface capable of coming into and out of contact with a valve seat on the periphery of the aperture of the bypass passage; and a valve shaft serving as a valve connecting member (a valve connecting portion), which is integrally provided to a head portion (on the opposite side from the valve surface) of the valve body and is fitted into and connected to the attachment hole of the attachment member. A stopping member (a stopper) for preventing detachment of the valve from the attachment member is integrally provided to a leading end portion of the valve shaft.

Here, when the boost pressure reaches a preset pressure, the link member is driven by the actuator to swing in the forward direction. Thus, the valve swings in the forward direction (an opening direction) through the stem and the attachment member, thereby opening the aperture of the bypass passage. When the boost pressure falls below the preset pressure after the aperture of the bypass passage is opened, the link member is driven by the actuator to swing in the reverse direction. Thus, the valve swings in the reverse direction (a closing direction) through the stem and the like, thereby closing the aperture of the bypass passage. By allowing for play (backlash) between the attachment member and the valve, the valve surface of the valve body has better fitting performance to (better contact with) the valve seat in closing the aperture of the bypass passage, thereby securing operation stability (reliability) of the waste gate valve.

Related techniques are illustrated in Japanese Patent Application Publication No. 2013-155687 (Patent Literature 1), Japanese Patent Application Publication No. 2009-236088 (Patent Literature 2), and Japanese Patent Application Publication No. 2008-101589 (Patent Literature 3).

SUMMARY

As mentioned above, in order to secure the operation stability of the waste gate valve, it is sometimes necessary that the waste gate should allow for play with the attachment member. In the meantime, pulsations of the exhaust gas (exhaust pulsation) from the engine side, pulsations from the actuator side, and the like occur when the vehicle turbocharger is in operation. For this reason, if the valve allows for the play with the attachment member, these pulsations can possibly cause vibrational contact (contact due to vibrations) between the valve and the valve seat in the vicinity of the stem when the aperture of the bypass passage starts opening or immediately before the aperture completes closing, for example. In this case, there is a concern that generation of chattering noise (contact noise due to the vibrations) from the waste gate valve may deteriorate quietness of the waste gate valve.

Here, as shown in Patent Literature 1, there is a waste gate valve which includes a leaf spring provided with a folded-back portion on a middle side thereof. One end of the leaf spring is fixed by welding to a valve body and the like, while another end of the leaf spring is fixed by welding to the attachment member. Accordingly, the number of joining positions (fixing positions) by welding and the like in the waste gate valve tends to increase. As a consequence, this configuration may affect an assembly performance of the waste gate valve due to reasons such as prolonged production time spent on assembling the waste gate valve.

The aforementioned problem occurs likewise in the case where a turbocharger such as a vehicle turbocharger is equipped with a variable-flow-rate valve mechanism other than the waste gate valve.

According to the present disclosure, it is possible to provide a variable-flow-rate valve mechanism, for example, which is capable of improving quietness of the turbocharger by reducing chattering noise from the variable-flow-rate valve mechanism while suppressing an influence on the assembly performance of the variable-flow-rate valve mechanism.

A first aspect of the present disclosure is that in a variable-flow-rate valve mechanism to be used in a turbocharger provided with a variable-flow-rate gas passage to adjust a flow rate of an exhaust gas to be supplied to a turbine wheel side, the variable-flow-rate gas passage being formed inside a turbine housing or inside a connector connected to the turbine housing in a communicating state with the turbine housing, the variable-flow-rate valve mechanism being configured to open and close an aperture (an aperture on an outlet side) of the variable-flow-rate gas passage, the variable-flow-rate valve mechanism includes: a stem supported by any one of the turbine housing and an outer wall portion of the connector; a link member having a base end portion integrally connected to a base end portion of the stem, and configured to be driven by an actuator to swing in forward and reverse directions around a shaft center of the stem; an attachment member integrally connected to the stem; a valve attached to the attachment member, and including a valve body (a valve body portion) having a valve surface capable of coming into and out of contact with a valve seat on the periphery of the aperture of the variable-flow-rate gas passage, and a valve connecting member (a valve connecting portion) provided to the valve body and connected to the attachment member; a stopping member attached to the valve connecting member; and a leaf spring including a folded-back portion provided on a middle side (a middle side between one end portion and another end portion), a cutout portion and an insertion hole formed in two end portions (the one end portion and the other end portion), respectively, and configured to allow insertion of the valve connecting member, in which one end portion of the leaf spring is fixed or pressed to a leading end portion of the attachment member and another end portion of the leaf spring is pressed to a head portion of the valve body, or otherwise the one end portion is fixed or pressed to the stopping member and the other end portion is pressed to the leading end portion of the attachment member, and the leaf spring biases any of the valve body and the stopping member in a direction of a shaft center of the valve connecting member (a direction away from the attachment member).

Here, in the description and claims of the present application, the term "turbocharger" is intended to include not only a single-stage turbocharger but also a multi-stage (with a low-pressure stage and a high-pressure stage) turbocharger. The expression "connector connected to the turbine housing in a communicating state with the turbine housing" is intended to include a pipe, a manifold, a casing, and the like each being connected to the gas introduction port or the gas discharge port of the turbine housing in a communicating state with the turbine housing. The term "variable-flow-rate gas passage" is intended to include the bypass passage, for example, for causing part of the exhaust gas to bypass the turbine wheel. The term "variable-flow-rate valve mechanism" is indented to include the waste gate valve, for example, which opens and closes the aperture of the bypass passage. The expression "provided" is intended to include a state of being provided directly as well as a state of being provided or formed indirectly through a different member. The expression "formed" is intended to include a state of being integrally formed. The expression "supported" is intended to include a state of being supported directly as well as a state of being supported indirectly through a different member. The expression "connected" is intended to include a state of being connected directly as well as a state of being connected indirectly through a different member. The expression "pressed" means establishing contact in a state of applying a pressure.

According to the first aspect of the present disclosure, while the turbocharger is in operation, the link member is driven by the actuator to swing in the forward direction. Thus, the valve swings in the forward direction through the stem and the attachment member, thereby opening the aperture of the variable-flow-rate gas passage. As a consequence, when the variable-flow-rate gas passage is the bypass passage, for example, the flow rate of the exhaust gas to be supplied to the turbine wheel side can be reduced.

Meanwhile, after the aperture of the variable-flow-rate gas passage is opened, the link member is driven by the actuator to swing in the reverse direction. Thus, the valve swings in the reverse direction through the stem and the attachment member, thereby closing the aperture of the variable-flow-rate gas passage. As a consequence, when the variable-flow-rate gas passage is the bypass passage, for example, the flow rate of the exhaust gas to be supplied to the turbine wheel side can be increased (ordinary operation of the variable-flow-rate valve mechanism).

The leaf spring biases the valve body or the stopping member in the direction of the shaft center of the valve connecting member. Thus, free movement (inclusive of free tilt and swing) of the valve relative to the attachment member is restricted, while the valve allows for play (backlash) with the attachment member. As a consequence, while the turbocharger is in operation, it is possible to suppress vibrational contact (contact due to vibrations) between the valve and the valve seat in the vicinity of the stem, the contact being attributed to pulsations of the exhaust gas (exhaust pulsation) from the engine side, pulsations from the actuator side, and the like when the aperture of the variable-flow-rate gas passage starts opening or immediately before the aperture completes closing, for example.

The one end portion of the leaf spring is fixed or pressed to the leading end portion of the attachment member, and the other end portion of the leaf spring is pressed to the head portion of the valve body. Otherwise, the one end portion of the leaf spring is fixed or pressed to the stopping member and the other end portion of the leaf spring is pressed to the leading end portion of the attachment member. Thus, it is possible to suppress an increase in the number of joining positions (fixing positions) by welding and the like in the variable-flow-rate valve mechanism. In the meantime, the cutout portion and the insertion hole are formed in the two end portions of the leaf spring, respectively. The valve shaft is inserted into the cutout portion and the insertion hole. Thus, the leaf spring can be easily attached to the valve shaft (characteristic operation of the variable-flow-rate valve mechanism).

A second aspect of the present disclosure is that in a turbocharger configured to supercharge air to be supplied to an engine by using energy of an exhaust gas from the engine, the turbocharger includes the variable-flow-rate valve mechanism according to the first aspect.

The second aspect achieves the same operation as the operation of the first aspect.

According to the present disclosure, when the aperture of the variable-flow-rate passage starts opening or immediately before the aperture completes closing, it is possible to suppress occurrence of vibrational contact between the valve and the valve seat in the vicinity of the stem attributed to pulsations of the exhaust gas from the engine side, and the like. In this way, it is possible to reduce chattering noise (contact noise due to the vibrations) from the variable-flow-rate valve mechanism, and thus to improve quietness of the variable-flow-rate valve mechanism, or in other words, quietness of the turbocharger. In addition, the leaf spring can be easily attached to the valve shaft while suppressing the increase in the number of joining positions by welding and the like on the variable-flow-rate valve mechanism. This makes it possible to keep time spent on assembling the variable-flow-rate valve mechanism from being prolonged and thus to suppress an influence on an assembly performance of the variable-flow-rate valve mechanism. In other words, according to the present disclosure, the quietness of the turbocharger can be improved by reducing the chattering noise from the variable-flow-rate valve mechanism while suppressing the influence on the assembly performance of the variable-flow-rate valve mechanism.

BRIEF DESCRIPTION OF DRAWINGS

FIGS. 1A and 1B are enlarged cross-sectional views taken along the I-I line in FIG. 2, in which FIG. 1A is a view showing a state where an aperture of a bypass passage is closed, and FIG. 1B is a view showing either a state where the aperture of the bypass passage starts opening or a state immediately before the aperture completes closing.

FIGS. 7A and 7B are cross-sectional views showing a modified example of the embodiment of the present disclosure, in which FIG. 7A is a view showing a state where the aperture of the bypass passage is closed, and FIG. 7B is a view showing either a state where the aperture of the bypass passage starts opening or a state immediately before the aperture completes closing.

FIGS. 8A and 8B are enlarged cross-sectional views taken along the VIII-VIII line in FIG. 9, in which FIG. 8A is a view showing a state where the aperture of the bypass passage is closed, and FIG. 8B is a view showing either a state where the aperture of the bypass passage starts opening or a state immediately before the aperture completes closing.

DETAILED DESCRIPTION OF THE EMBODIMENTS

Figure 1A:
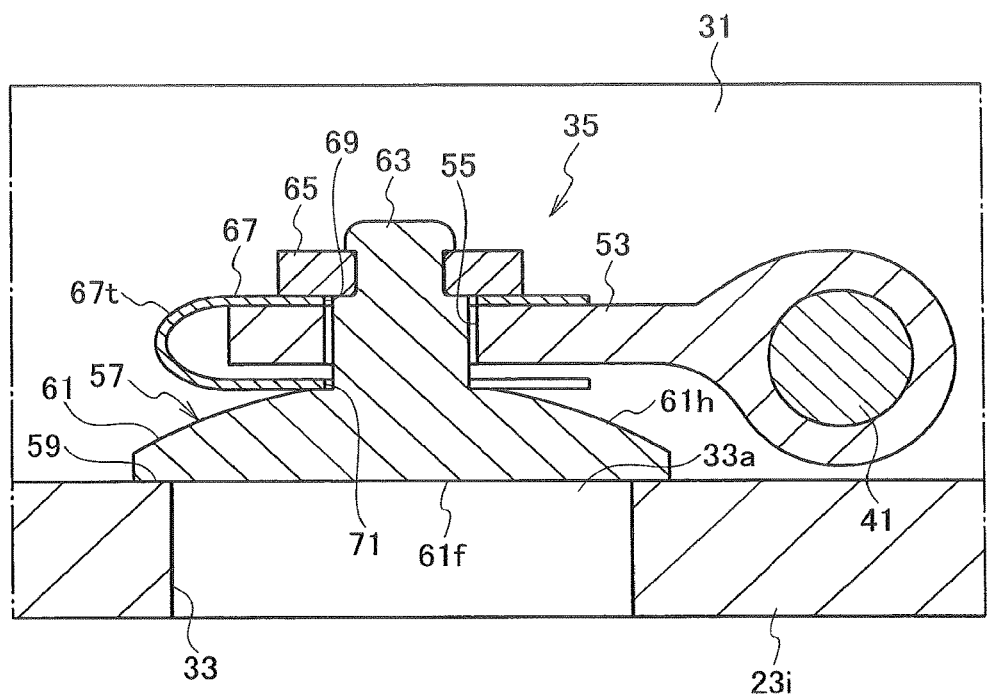

Embodiments of the present disclosure will be described with reference to the drawings. Here, as shown in the drawings, "L" represents a left direction and "R" represents a right direction.

First Embodiment of Present Disclosure

Figure 6:
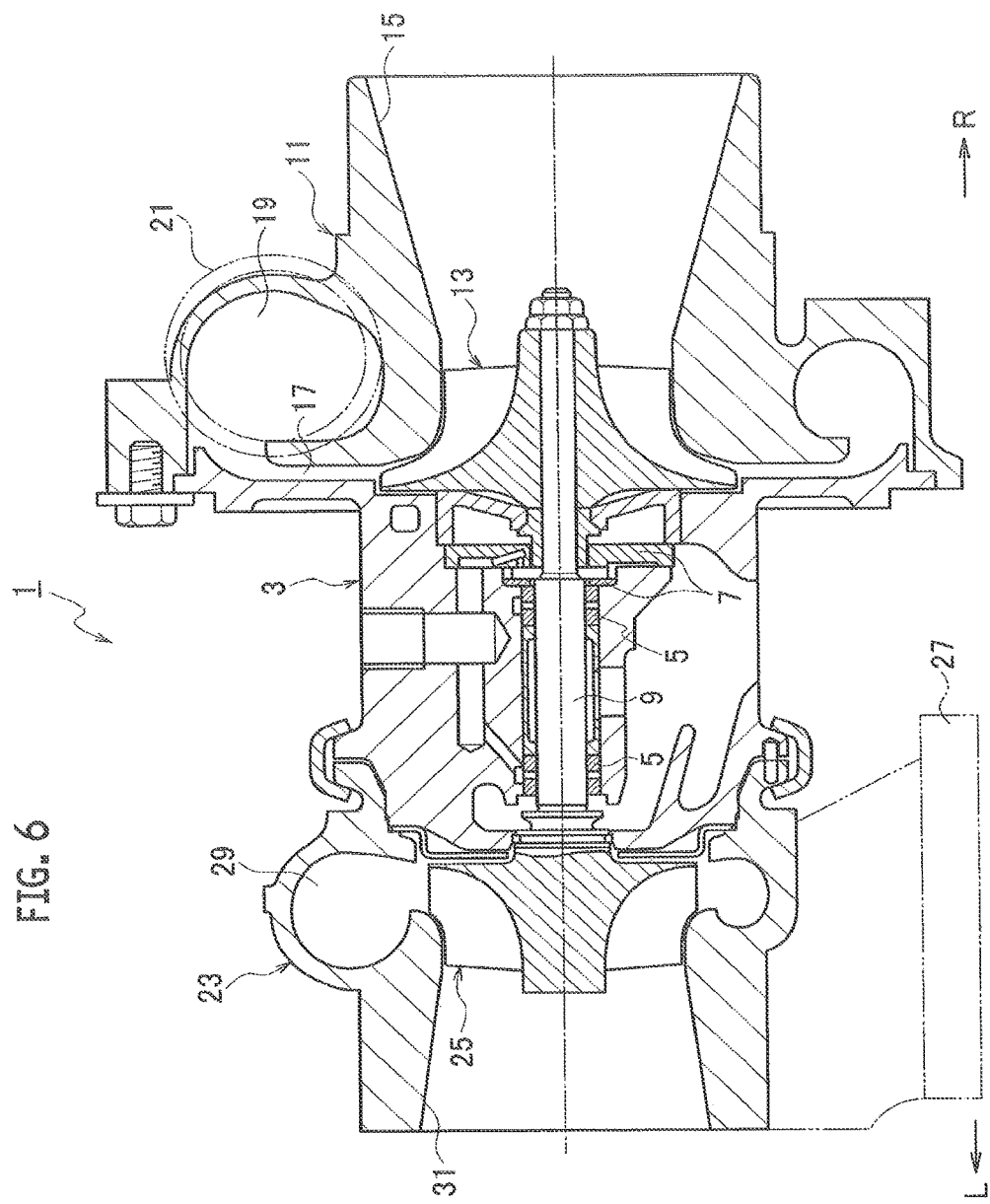
FIG. 6 is a front sectional view of the vehicle turbocharger according to the embodiment (the first embodiment) of the present disclosure.

As shown in FIG. 6, a vehicle turbocharger (an example of turbochargers) 1 according to an embodiment (a first embodiment) of the present disclosure is configured to supercharge (compress) air to be supplied to an engine (not shown) by using energy of an exhaust gas from the engine.

Here, a specific configuration and other features of the vehicle turbocharger 1 are as described below.

The vehicle turbocharger 1 includes a bearing housing 3. A pair of radial bearings 5 and a pair of thrust bearings 7 are provided inside the bearing housing 3. In addition, a rotor shaft (a turbine shaft) 9 extending in a right-left direction is rotatably provided to the multiple bearings 5 and 7. In other words, the rotor shaft 9 is rotatably provided to the bearing housing 3 through the multiple bearings 5 and 7.

A compressor housing 11 is provided on a right side of the bearing housing 3. A compressor wheel 13 configured to compress the air by using a centrifugal force is rotatably provided inside the compressor housing 11. The compressor wheel 13 is connected concentrically with and integrally to a right end portion of the rotor shaft 9.

An air introduction port (an air introduction passage) 15 for introducing the air is formed on an inlet side (an upstream side in view of a mainstream direction of the air) of the compressor wheel 13 in the compressor housing 11. The air introduction port 15 is connected to an air cleaner (not shown) configured to clean up the air. An annular diffuser passage 17 configured to boost the compressed air is formed on an outlet side (a downstream side in view of the mainstream direction of the air) of the compressor wheel 13, which is located between the bearing housing 3 and the compressor housing 11. A compressor scroll passage 19 in a scroll shape is formed inside the compressor housing 11, in such a way as to surround the compressor wheel 13. The compressor scroll passage 19 communicates with the diffuser passage 17. In addition, an air discharge port (an air discharge passage) 21 for discharging the compressed air is formed at an appropriate position of the compressor housing 11. The air discharge port 21 communicates with the compressor scroll passage 19, and is connected to an air intake manifold (not shown) of the engine.

A turbine housing 23 is provided on a left side of the bearing housing 3. A turbine wheel 25 configured to generate a rotative force (rotation torque) by using the pressure energy of the exhaust gas is rotatably provided inside the turbine housing 23. The turbine wheel 25 is connected concentrically with and integrally to a left end portion of the rotor shaft 9.

Figure 4:
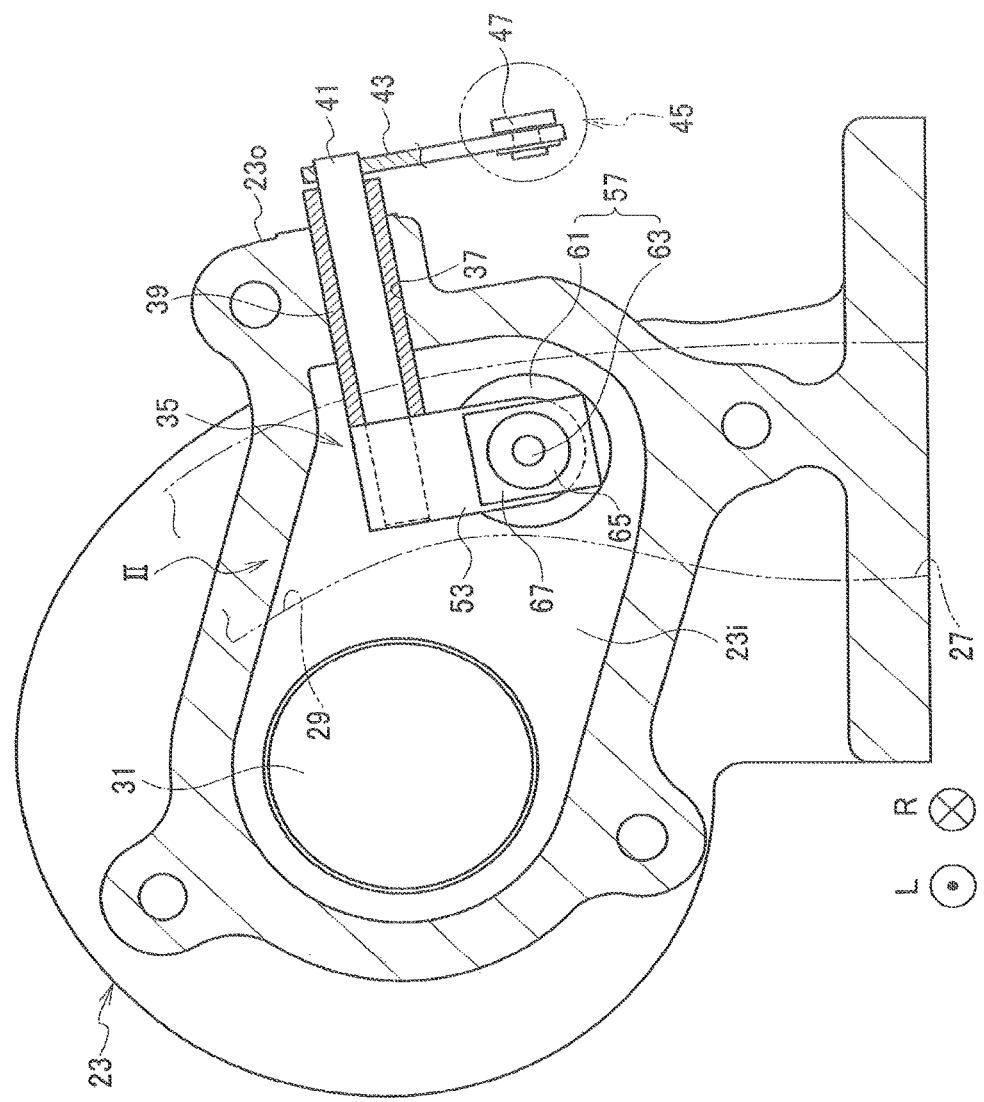
FIG. 4 is a cross-sectional view taken along the IV-IV line in FIG. 5.
Figure 5:
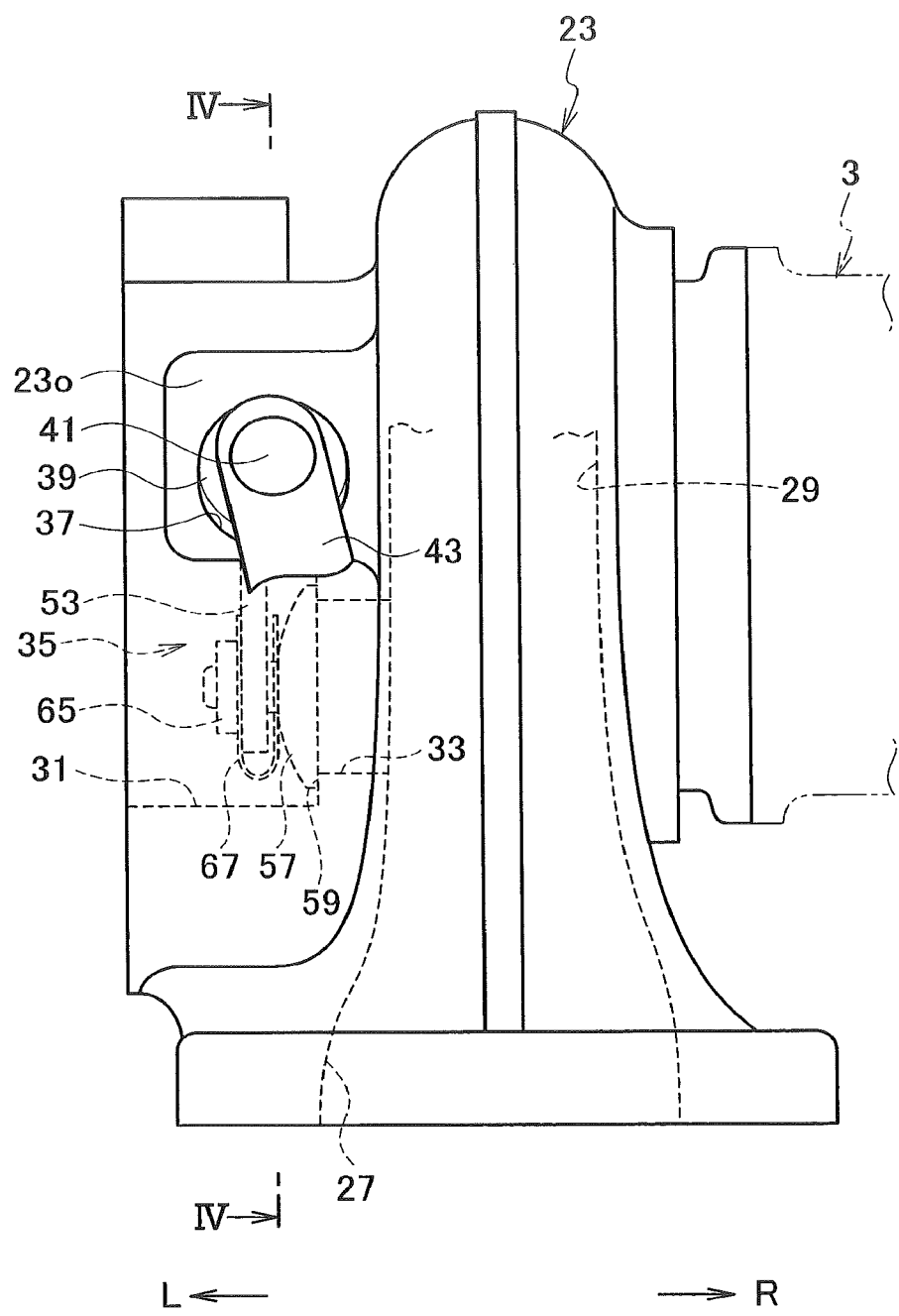
FIG. 5 is a partial front view of a vehicle turbocharger according to the first embodiment of the present disclosure.

As shown in FIGS. 4 to 6, a gas introduction port (a gas introduction passage) 27 for introducing the exhaust gas is formed at an appropriate position of the turbine housing 23. The gas introduction port 27 is connected to an exhaust manifold (not shown) of the engine. A turbine scroll passage 29 in a scroll shape is formed on an inlet side (an upstream side in view of a mainstream direction of the exhaust gas) of the turbine wheel 25 inside the turbine housing 23. In addition, a gas discharge port (a gas discharge passage) 31 for discharging the exhaust gas is formed on an outlet side (a downstream side in view of the mainstream direction of the exhaust gas) of the turbine wheel 25 in the turbine housing 23. The gas discharge port 31 is connected to a catalyst (not shown) for cleaning up the exhaust gas, through a connecting pipe (not shown) and the like.

As shown in FIGS. 1A, 1B, 2, and 4, a bypass passage (one of variable-flow-rate gas passages) 33 is formed at an inner wall portion 23i on the gas discharge port 31 side of the turbine housing 23, in order to cause part of the exhaust gas introduced from the gas introduction port 27 to be led out to the gas discharge port 31 side while bypassing the turbine wheel 25. In other words, the bypass passage 33 is formed in order to adjust a flow rate of the exhaust gas to be supplied to the turbine wheel 25 side. A waste gate valve (one of variable-flow-rate valve mechanisms) 35 is provided at an appropriate position of the turbine housing 23. The waste gate valve 35 opens and closes an aperture (an aperture on an outlet side) 33a of the bypass passage 33. Here, a specific configuration of the waste gate valve 35 is as follows.

A support hole 37 is penetratingly formed in an outer wall portion 23o of the turbine housing 23. A bush (a bearing) 39 is press-fitted into the support hole 37. A stem (a rotating shaft) 41 is supported by the bush 39 in such a way as to be rotatable in forward and reverse directions. In other words, the stem 41 is supported in the support hole 37 of the turbine housing 23 in such a way as to be rotatable in the forward and reverse directions through the bush 39. A base end portion (one end portion) of the stem 41 projects outward from the outer wall portion 23o of the turbine housing 23.

A base end portion (one end portion) of a link member (a link plate) 43 is integrally connected by fillet welding or the like to the base end portion of the stem 41. The link member 43 is driven by an actuator 45 to swing in forward and reverse directions around a shaft center of the stem 41. The actuator 45 includes an actuating rod 47 which is reciprocable in right and left directions. A leading end portion of the actuating rod 47 is rotatably connected to a leading end portion (another end portion) of the link member 43 through a connecting pin 49, a stop ring 51, and the like. Here, the actuator 45 is a diaphragm actuator such as those disclosed in Japanese Patent Application Publications No. Hei 10-103069, No. 2008-25442, and the like. Here, the base end portion of the link member 43 may be integrally connected to the base end portion of the stem 41 by TIG welding, laser beam welding, swaging, and the like instead of fillet welding. An electronically controlled electric actuator or a hydraulically driven hydraulic actuator may be used as the actuator 45 instead of the diaphragm actuator.

A base end portion of an attachment member (an attachment plate) 53 is integrally connected by fillet welding or the like to a leading end portion (another end portion) of the stem 41. The attachment member 53 is located inside the turbine housing 23. Meanwhile, an attachment hole 55 having either a double-D shape or a circular shape is penetratingly formed in a leading end portion of the attachment member 53. Here, the base end portion of the attachment member 53 may be integrally connected to the leading end portion of the stem 41 by TIG welding, laser beam welding, swaging, and the like instead of fillet welding.

A valve 57 is fitted into the attachment hole 55 of the attachment member 53. The valve 57 allows for play (inclusive of tilt and slight movement) with the attachment member 53. Moreover, the valve 57 includes a valve body (a valve body portion) 61 provided with a valve surface 61f in a circular shape, which can come into and out of contact with a valve seat 59 on the periphery of the aperture 33a of the bypass passage 33. A head portion (a region on the opposite side from the valve surface 61f) 61h of the valve body 61 takes on a truncated conical shape. A valve shaft 63 having a cross section of a circular shape serving as a valve connecting member (a valve connecting portion) is integrally formed in the center of the head portion 61h of the valve body 61. The valve shaft 63 is fitted into and thus connected to the attachment hole 55 of the attachment member 53. By allowing for play between the attachment member 53 and the valve 57, fitting performance (contact) of the valve surface 61f of the valve body 61 is improved, whereby operation stability (reliability) of the waste gate valve 35 is secured. As an example, an annular stopping member (a stopper) 65 for preventing detachment of the valve 57 from the attachment member 53 is integrally provided at a leading end portion of the valve shaft 63 by fillet welding. The stopping member 65 does not always have to take on the annular shape. The stopping member 65 may be integrally connected to the leading end portion of the valve shaft 63 by TIG welding, laser beam welding, swaging, and the like instead of fillet welding. Instead of integrally forming the valve shaft 63 in the center of the head portion 61h of the valve body 61 and integrally providing the stopping member 65 at the leading end portion of the valve shaft 63 by fillet welding and the like, the valve shaft 63 may be integrally provided in the center of the head portion 61h of the valve body 61 by swaging and the like and the stopping member 65 may be integrally formed at the leading end portion of the valve shaft 63. While the circular valve surface 61f of the valve body 61 is described as an example, the valve surface 61f may be changed into an arbitrary shape other than the circular shape such as a quadrangular shape and an oval shape instead of forming the valve surface 61f into the circular shape. While the circular cross section of the valve shaft 63 is described as an example, the cross section may be changed into an arbitrary shape other than the circular shape such as a quadrangular shape instead of forming the cross section into the circular shape. Instead of integrally forming the valve shaft 63, which serves as the valve connecting member, at the head portion 61h of the valve body 61, a different valve connecting member (not shown) may be provided to the valve body 61 in such a way as to penetrate the valve body 61, and the different valve member may be connected to the attachment member 53. Although the valve shaft 63 is fitted into and thus connected to the attachment hole 55 of the attachment member 53 as an example, the way to connect the valve shaft 63 to the attachment hole 55 of the attachment member 53 can be changed as appropriate within the range that allows for the play between the attachment member 53 and the valve 57.

Figure 1B:
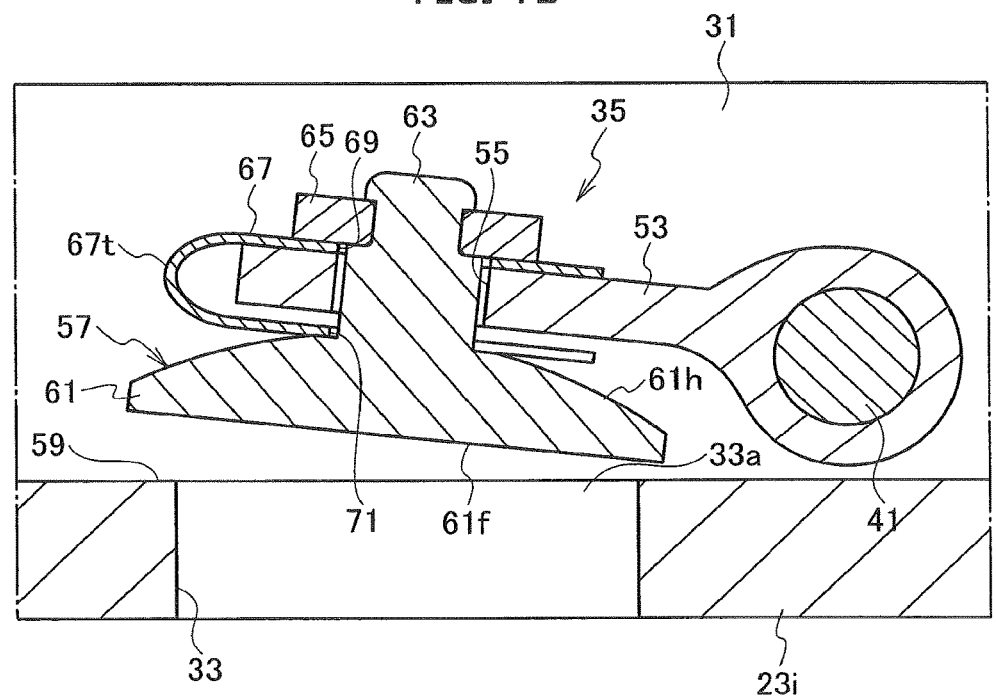
Figure 2:
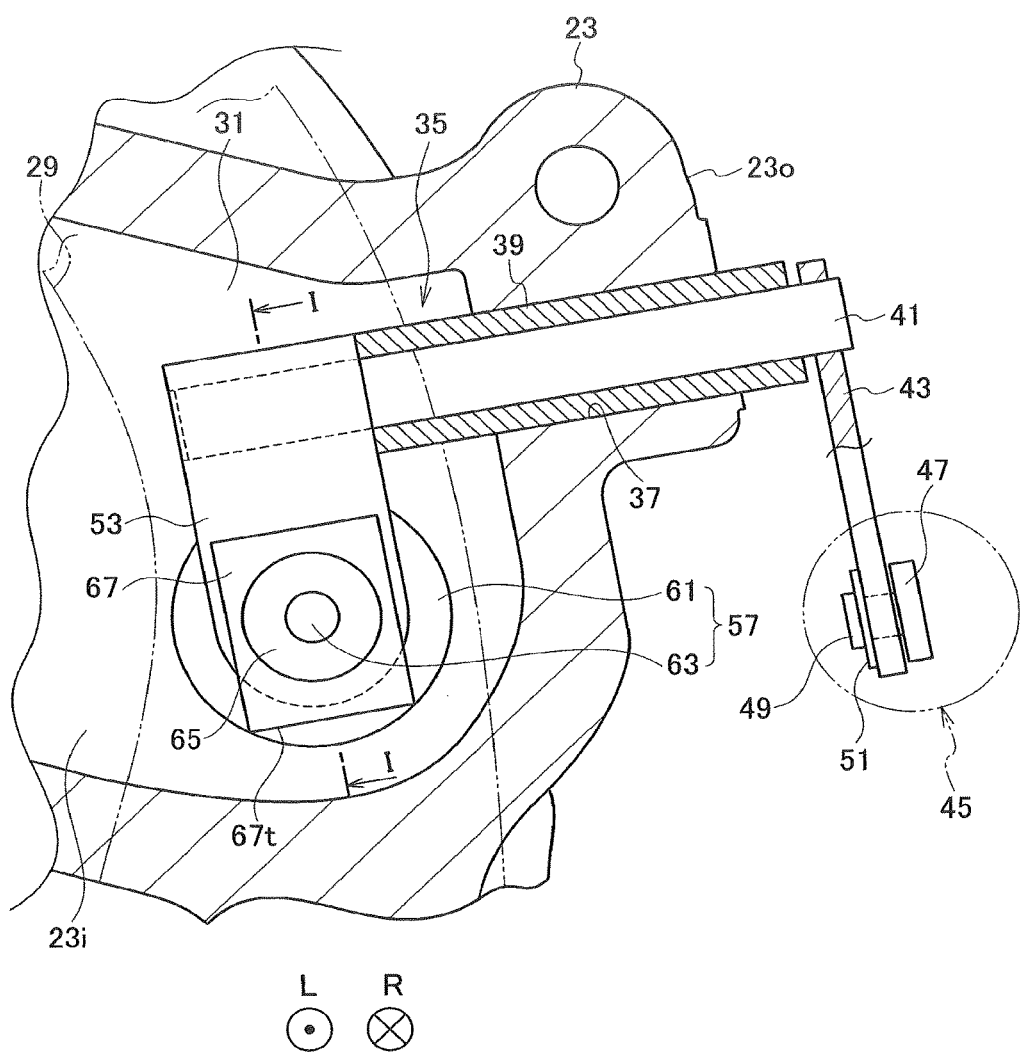
FIG. 2 is an enlarged view of a portion indicated with the arrow II in FIG. 4, which shows configurations of surrounding parts inclusive of a waste gate valve according to a first embodiment of the present disclosure.
Figure 3:
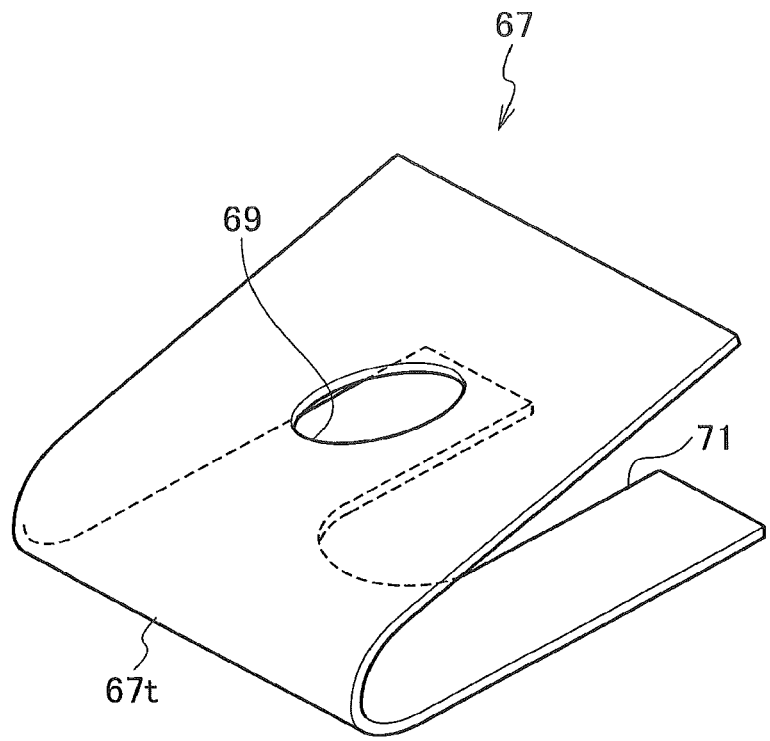
FIG. 3 is a perspective view of a leaf spring in the waste gate valve according to the first embodiment of the present disclosure.

As shown in FIGS. 1A, 1B, and 3, the valve shaft 63 is provided with a leaf spring 67, which biases the valve body 61 in a direction to move the valve body 61 away from the attachment member 53 (in the direction of the shaft center of the valve shaft 63). The leaf spring 67 includes a folded-back portion 67t on a middle side thereof (on a middle side between one end portion and another end portion thereof) manufactured by press forming, for example, and has a U-shape when viewed sideways. In addition, the one end portion of the leaf spring 67 is located between the leading end portion of the attachment member 53 and the stopping member 65. An insertion hole 69 to allow insertion of the valve shaft 63 is formed (penetrating formed) in the one end portion of the leaf spring 67. The other end portion of the leaf spring 67 is located between the leading end portion of the attachment member 53 and the head portion 61h of the valve body 61. A U-shaped cutout portion 71 for allowing insertion of the valve shaft 63 is formed in the other end portion of the leaf spring 67. The one end portion of the leaf spring 67 is fixed to the attachment member 53 by TIG welding, laser beam welding, and the like. The other end portion of the leaf spring 67 is pressed to the head portion 61h of the valve body 61 by an elastic force of the leaf spring 67. Although the leaf spring 67 has the U-shape when viewed sideways as an example, the shape (inclusive of the shape viewed sideways) of the leaf spring 67 may be changed into an arbitrary shape within the range that can achieve the effect of the present disclosure. For instance, the folded-back portion 67t may be formed into a folded shape. In the leaf spring 67, either the insertion hole 69 or the U-shaped cutout portion 71 only needs to be formed at each of the two end portions of the leaf spring 67. Instead of forming the insertion hole 69 in the one end portion of the leaf spring 67, a U-shaped cutout portion (not shown) for allowing insertion of the valve shaft 63 may be formed therein. Instead of forming the U-shaped cutout portion 71 in the other end portion of the leaf spring 67, an insertion hole (not shown) for allowing insertion of the valve shaft 63 may be formed therein. As for the material of the leaf spring 67, a heat-resistant metal material such as a Ni—Co based alloy and stainless steel is selected in consideration of heat resistance, the spring constant, and the like of the leaf spring 67. A heat-resistant coating may be applied to surfaces of the leaf spring 67. In the above-described embodiment, the cutout portion 71 is formed into the U-shape as an example. However, the cutout portion 71 may be changed into an arbitrary shape such as a quadrangular shape instead of the U-shape. Multiple retaining projections (not shown) may be formed to face each other on an entrance side of the cutout portion 71. In this case, the size of each projection is set so as to secure a retaining force in consideration of a dimension of an outside diameter of the valve shaft 63, the spring constant of the leaf spring 67, and the like.

Next, the operation and effect of the first embodiment of the present disclosure will be described.

The exhaust gas introduced from the gas introduction port 27 flows from the inlet side to the outlet side of the turbine wheel 25 via the turbine scroll passage 29. Thus, the rotative force (the rotation torque) is generated by using the pressure energy of the exhaust gas, thereby rotating the rotor shaft 9 and the compressor wheel 13 integrally with the turbine wheel 25. As a consequence, it is possible to compress the air introduced from the air introduction port 15, to discharge the compressed air from the air discharge port 21 via the diffuser passage 17 and the compressor scroll passage 19, and thus to supercharge the air to be supplied to the engine (ordinary operation of the vehicle turbocharger 1).

When a boost pressure (a pressure on the outlet side of the compressor wheel 13) reaches a preset pressure while the vehicle turbocharger 1 is in operation, the link member 43 is driven by the actuator 45 to swing in the forward direction, and the stem 41 is turned in the forward direction. Thus, the valve 57 swings in the forward direction (an opening direction), thereby opening an aperture of the bypass passage 33. As a consequence, the flow rate of the exhaust gas to be supplied to the turbine wheel 25 side can be reduced by causing part of the exhaust gas introduced from the gas introduction port 27 to bypass the turbine wheel 25.

Meanwhile, when the boost pressure falls below the preset pressure after the aperture of the bypass passage 33 is opened, the link member 43 is driven by the actuator 45 to swing in the reverse direction, and the stem 41 is turned in the reverse direction. Thus, the valve 57 swings in the reverse direction (a closing direction), thereby closing the aperture of the bypass passage 33. As a consequence, the flow rate of the exhaust gas to be supplied to the turbine wheel 25 side can be increased by interrupting the flow of the exhaust gas in the bypass passage 33 (ordinary operation of the waste gate valve 35).

The leaf spring 67 biases the valve body 61 in a direction to move the valve body 61 away from the attachment member 53. Thus, free movement (inclusive of free tilt and swing) of the valve 57 relative to the attachment member 53 is restricted, while the valve 57 allows for play with the attachment member 53. As a consequence, while the vehicle turbocharger 1 is in operation, it is possible to suppress vibrational contact (contact due to vibrations) between the valve 57 and the valve seat 59 in the vicinity of the stem 41, the contact being attributed to pulsations of the exhaust gas (exhaust pulsation) from the engine side, pulsations from the actuator 45 side, and the like when the aperture 33a of the bypass passage 33 starts opening or immediately before the aperture 33a completes closing, for example.

The one end portion of the leaf spring 67 is fixed to the leading end portion of the attachment member 53, and the other end portion of the leaf spring 67 is pressed to the head portion 61h of the valve body 61. Thus, it is possible to suppress an increase in the number of joining positions (fixing positions) by welding and the like in the waste gate valve 35. The insertion hole 69 and the U-shaped cutout portion 71 for allowing insertion of the valve shaft 63 are need in the two end portions (the one end portion and the other end portion) of the leaf spring 67, respectively. Thus, the leaf spring 67 can be easily attached to the valve shaft 63. The one end portion of the leaf spring 67 is located between the leading end portion of the attachment member 53 and the stopping member 65, while the other end portion of the leaf spring 67 is located between the leading end portion of the attachment member 53 and the head portion 61h of the valve body 61. Accordingly, the leaf spring 67 can be attached to the valve shaft 63 without having to significantly change the design (characteristic operation of the waste gate valve 35).

Therefore, according to the first embodiment of the present disclosure, it is possible to suppress the vibrational contact between the valve 57 and the valve seat 59 in the vicinity of the stem 41, the contact being attributed to the pulsations of the exhaust gas from the engine side, and the like when the vehicle turbocharger 1 is in operation. In this way, it is possible to reduce chattering noise (contact noise due to the vibrations) from the waste gate valve 35, and thus to improve quietness of the waste gate valve 35, or in other words, quietness of the vehicle turbocharger 1. In addition, the leaf spring 67 can be easily attached to the valve shaft 63 while suppressing the increase in the number of joining positions by welding and the like in the waste gate valve 35 without having to significantly change the design. This makes it possible to keep assembling time for the waste gate valve 35 from being prolonged and thus to suppress an influence on an assembly performance of the waste gate valve 35. In other words, according to the embodiment of the present disclosure, the quietness of the vehicle turbocharger 1 can be improved by reducing the chattering noise from the waste gate valve 35 while suppressing the influence on the assembly performance of the waste gate valve 35.

Modified Example of First Embodiment

As shown in FIGS. 7A and 7B, in a modified example of the first embodiment of the present disclosure, instead of the configuration in which the one end portion of the leaf spring 67 is located between the leading end portion of the attachment member 53 and the stopping member 65 and is fixed to the attachment member 53 (see FIG. 1A), the one end portion of the leaf spring 67 is located between the leading end portion of the attachment member 53 and the head portion 61h of the valve body 61 and is pressed to the attachment member 53 by the elastic force of the leaf spring 67. Here, among the multiple constituents of the modified example of the first embodiment, those corresponding to the constituents of the first embodiment are denoted by the same reference signs in the drawings.

The modified example of the first embodiment also achieves the same operation and effect as the first embodiment does.

Although the illustration is omitted, instead of the configuration in which the one end portion of the leaf spring 67 is fixed or pressed to the leading end portion of the attachment member 53 and the other end portion of the leaf spring 67 is pressed to the head portion 61h of the valve body 61, the one end portion of the leaf spring 67 may be fixed or pressed to the stopping member 65 and the other end portion of the leaf spring 67 may be pressed to the leading end portion of the attachment member 53. In the latter case, the leaf spring 67 biases the stopping member 65 in a direction to move the stopping member 65 away from the attachment member 53 (in the direction of the shaft center of the valve shaft 63).

Second Embodiment

Figure 8A:
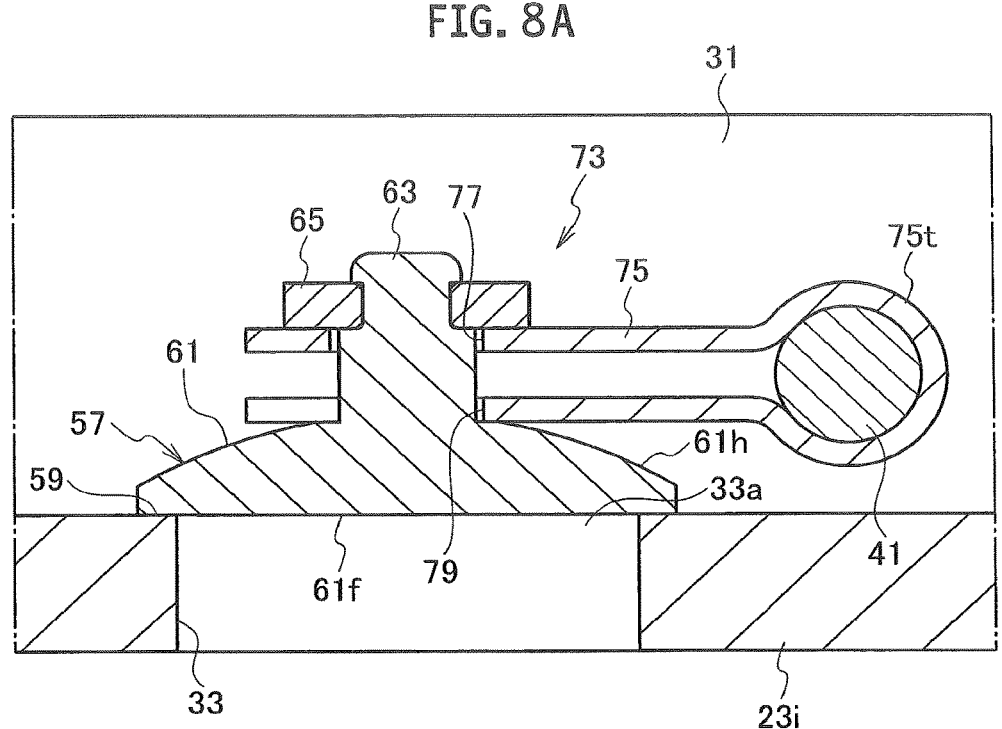
Figure 8B:
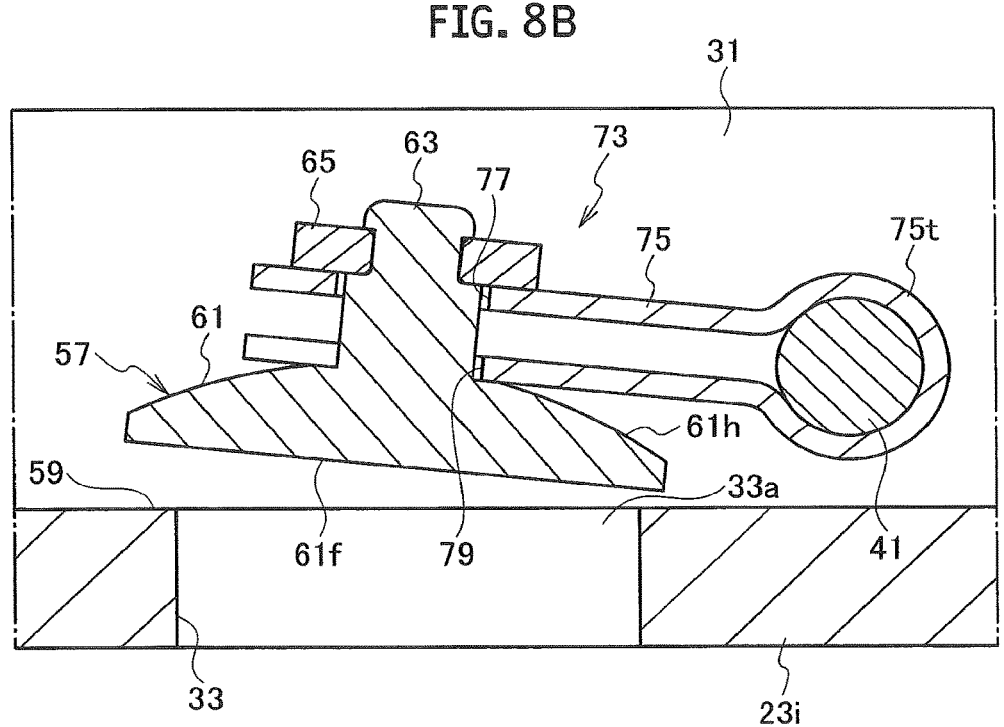
Figure 9:
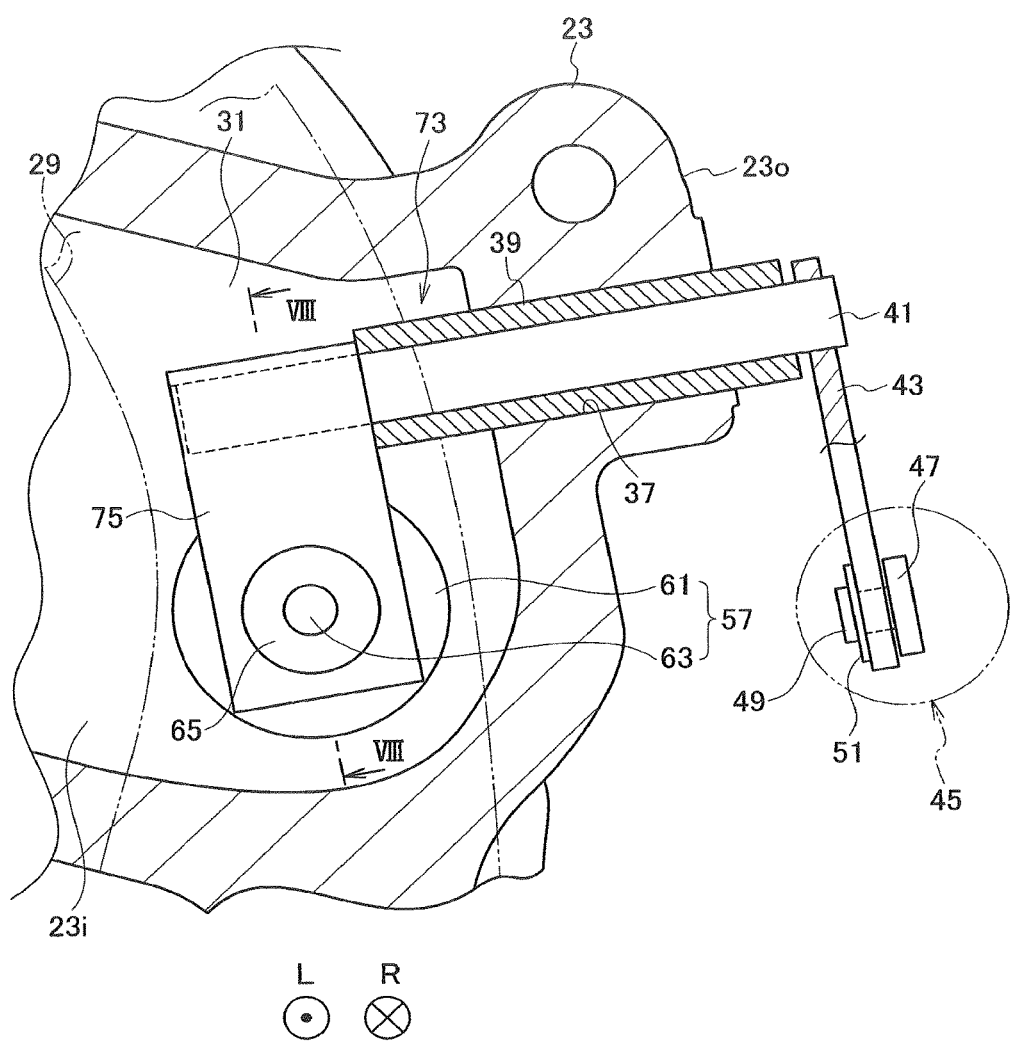
FIG. 9 is view showing configurations of surrounding parts inclusive of a waste gate valve according to a second embodiment of the present disclosure.

As shown in FIGS. 8A, 8B, and 9, in a second embodiment of the present disclosure, the vehicle turbocharger 1 is equipped with a different waste gate valve 73 instead of the waste gate valve 35 (see FIG. 1). The waste gate valve 73 according to the second embodiment has a similar configuration to that of the waste gate valve 35 according to the first embodiment. A description will be given below only of portions of the configuration of the waste gate valve 73 which are different from those of the waste gate valve 35. Here, among multiple constituents of the second embodiment, those corresponding to the constituents of the first embodiment are denoted by the same reference signs in the drawings.

Figure 10:
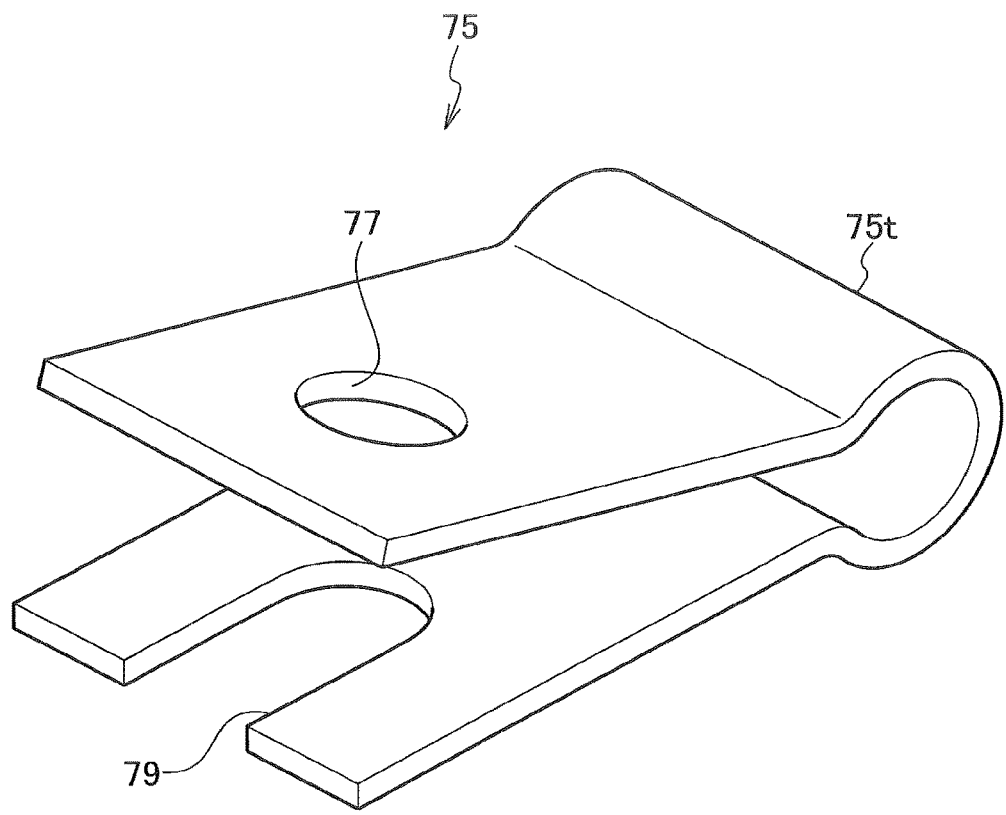
FIG. 10 is a perspective view of an attachment member in the waste gate valve according to the second embodiment of the present disclosure.

As shown in FIGS. 8A, 8B, and 10, a base end portion of an attachment member 75 is integrally connected by fillet welding or the like to the leading end portion of the stem 41. The attachment member 75 includes a folded-back portion 75t on its middle side, which is manufactured by press forming, for example. An insertion hole 77 for allowing insertion of the valve shaft 63 serving as the valve connecting member (the valve connecting portion) is formed in one end portion (one leading end portion) of the attachment member 75. The one end portion of the attachment member 75 is pressed to the stopping member 65 by an elastic force of the attachment member 75. A U-shaped cutout portion 79 for allowing insertion of the valve shaft 63 is formed in another end portion (another leading end portion) of the attachment member 75. The other end portion of the attachment member 75 is pressed to the head portion 61h of the valve body 61 by the elastic force of the attachment member 75. The attachment member 75 has a function as a leaf spring, which biases the valve body 61 in a direction to move the valve body 61 away from the one end portion of the attachment member 75 (in the direction of the shaft center of the valve shaft 63). Here, the one end portion of the attachment member 75 may be fixed by fillet welding or the like to the stopping member 65 instead of being pressed to the stopping member 65. A retaining projection (not shown) may be formed on an entrance side of the U-shaped cutout portion 79 of the attachment member 75. Instead of forming the insertion hole 77 in the one end portion of the attachment member 75, a U-shaped cutout portion (not shown) for allowing insertion of the valve shaft 63 may be formed therein. Instead of forming the U-shaped cutout portion 79 in the other end portion of the attachment member 75, an insertion hole (not shown) for allowing insertion of the valve shaft 63 may be formed therein. As for the material of the attachment member 75, a heat-resistant metal material such as a Ni—Co based alloy and stainless steel is selected in consideration of heat resistance, the spring constant, and the like of the attachment member 75. A heat-resistant coating may be applied to surfaces of the attachment member 75.

Next, the operation and effect of the second embodiment of the present disclosure will be described.

The attachment member 75 biases the valve body 61 in a direction to move the valve body 61 away from the one end portion of the attachment member 75. Thus, free movement of the valve 57 relative to the one end portion of the attachment member 75 is restricted, while the valve 57 allows for play with the attachment member 75. As a consequence, it is possible to suppress vibrational contact between the valve 57 and the valve seat 59 in the vicinity of the stem 41, the contact being attributed to pulsations of the exhaust gas from the engine side, pulsations from the actuator 45 side, and the like while the vehicle turbocharger 1 is in operation, or more specifically, when the aperture 33a of the bypass passage 33 starts opening or immediately before the aperture 33a completes closing.

The attachment member 75 has the function as the leaf spring. Thus, it is possible to suppress an increase in number of components of the waste gate valve 73.

Therefore, according to the second embodiment of the present disclosure, it is possible to suppress the vibrational contact between the valve 57 and the valve seat 59 in the vicinity of the stem 41, the contact being attributed to the pulsations of the exhaust gas from the engine side, and the like when the vehicle turbocharger 1 is in operation. In this way, it is possible to reduce chattering noise from the waste gate valve 73, and thus to improve quietness of the waste gate valve 73, or in other words, quietness of the vehicle turbocharger 1. Moreover, it is also possible to suppress the increase in number of components of the waste gate valve 73. This makes it possible to suppress an influence on an assembly performance of the waste gate valve 73. In other words, the second embodiment can also achieve the same effects as those of the first embodiment.

The present disclosure is not limited only to the foregoing description of the embodiments, but can also be embodied in other aspects as mentioned below.

For example, instead of providing the waste gate valve 35 configured to open and close the aperture 33a of the bypass passage 33 at the appropriate position of the turbine housing 23, a waste gate valve (not shown) configured to open and close an aperture of a bypass passage (not shown) formed in an exhaust manifold (not shown), which is connected in the state of being communicating with the gas introduction port 27 of the turbine housing 23, may be provided at an appropriate position of the exhaust manifold. Meanwhile, although each of the folded-back portion 67t of the leaf spring 67 and the folded-back portion 75t of the attachment member 75 is manufactured by press forming as an example, any of arbitrary manufacturing modes including formation by joining such as welding of two spring constituent members (not shown) constituting any of the leaf spring 67 and the attachment member 75. Nevertheless, as a consequence of manufacturing the of the folded-back portion 67t of the leaf spring 67 and the like by subjecting a metal plate to press forming, the folded-back portion 67t of the leaf spring 67 and the like can be manufactured easily so that productivity of the leaf spring 67 and the like can be improved.

In addition, the scope of rights encompassed by the present disclosure is not limited to the above-described embodiments. Specifically, the variable-flow-rate valve mechanism of this application is not limited only to the above-described waste gate valve 35. The present disclosure is also applicable, for example, to a switching valve mechanism (not shown) configured to perform switching for a certain turbine scroll passage among multiple turbine scroll passages (not shown) formed in a turbine housing (not shown), the switching between a state in which to supply an exhaust gas to the certain turbine scroll passage and a state in which to stop the supply of the exhaust gas thereto, as shown in Japanese Utility Model Registration Application Publication No. Sho 61-33923, Japanese Patent Application Publication No. 2001-263078, and the like. In addition, the present disclosure is also applicable, for example, to a switching valve mechanism (not shown) configured to perform switching for a turbine housing at a certain stage among multiple stages of turbine housings (not shown), the switching between a state in which to supply an exhaust gas to the turbine housing at the certain stage and a state in which to stop the supply of the exhaust gas thereto, as shown in Japanese Patent Application Publications No. 2010-209688, No. 2011-106358, and the like.

What is claimed is:

1. A variable-flow-rate valve mechanism to be used in a turbocharger provided with a variable-flow-rate gas passage to adjust a flow rate of an exhaust gas to be supplied to a turbine wheel side, the variable-flow-rate gas passage being formed inside a turbine housing or inside a connector connected to the turbine housing in a communicating state with the turbine housing, the variable-flow-rate valve mechanism being configured to open and close an aperture of the variable-flow-rate gas passage, the variable-flow-rate valve mechanism comprising:
a stem supported by any one of the turbine housing and an outer wall portion of the connector;
a link member having a base end portion integrally connected to a base end portion of the stem, and configured to be driven by an actuator to swing in forward and reverse directions around a shaft center of the stem;
an attachment member integrally connected to a leading end portion of the stem;
a valve including
a valve body attached to the attachment member, the valve body having a valve surface capable of coming into and out of contact with a valve seat on the periphery of the aperture of the variable-flow-rate gas passage, and
a valve shaft provided to the valve body and connected to the attachment member; and
a stopper attached to the valve shaft,
wherein
the attachment member is formed in a plate shape,
the attachment device includes a folded-back portion provided on a middle side,
a cutout portion and an insertion hole are formed in two end portions of the attachment device, respectively, in order to allow insertion of the valve shaft,
a first end portion of the attachment device is fixed or pressed to the stopper and a second end portion of the attachment device is pressed to a head portion of the valve body, and
the attachment device has a function as a leaf spring to bias the valve body in a direction of a shaft center of the valve shaft.

2. A turbocharger configured to supercharge air to be supplied to an engine by using energy of an exhaust gas from the engine, comprising:
the variable-flow-rate valve mechanism according to claim 1.

3. The variable-flow-rate valve mechanism according to claim 1, wherein the first end portion and the second end portion of the attachment device are located between the stopper and the head portion of the valve body.

4. The variable-flow-rate valve mechanism according to claim 1, wherein the insertion hole is formed in the first end portion of the attachment device, and the cutout portion is formed in the second end portion of the attachment device.

5. The variable-flow-rate valve mechanism according to claim 1, wherein the first end portion of the attachment device is fixed to the stopper.

6. The variable-flow-rate vale mechanism according to claim 1, wherein the head portion of the valve body passes through the insertion hole formed in the first end portion of the attachment device and the cutout portion formed in the second end portion of the attachment device.

* * * * *